Patented Aug. 25, 1936

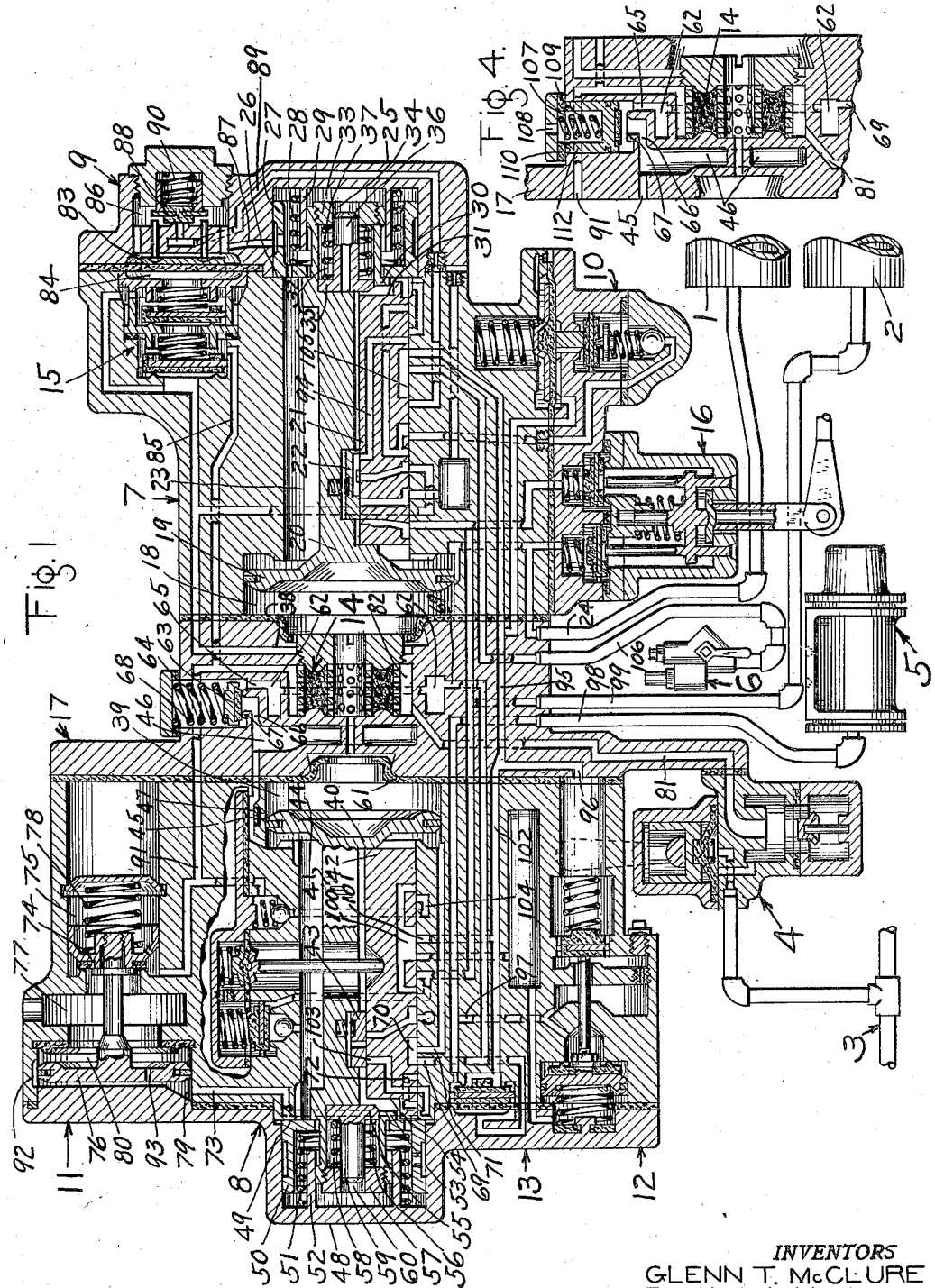

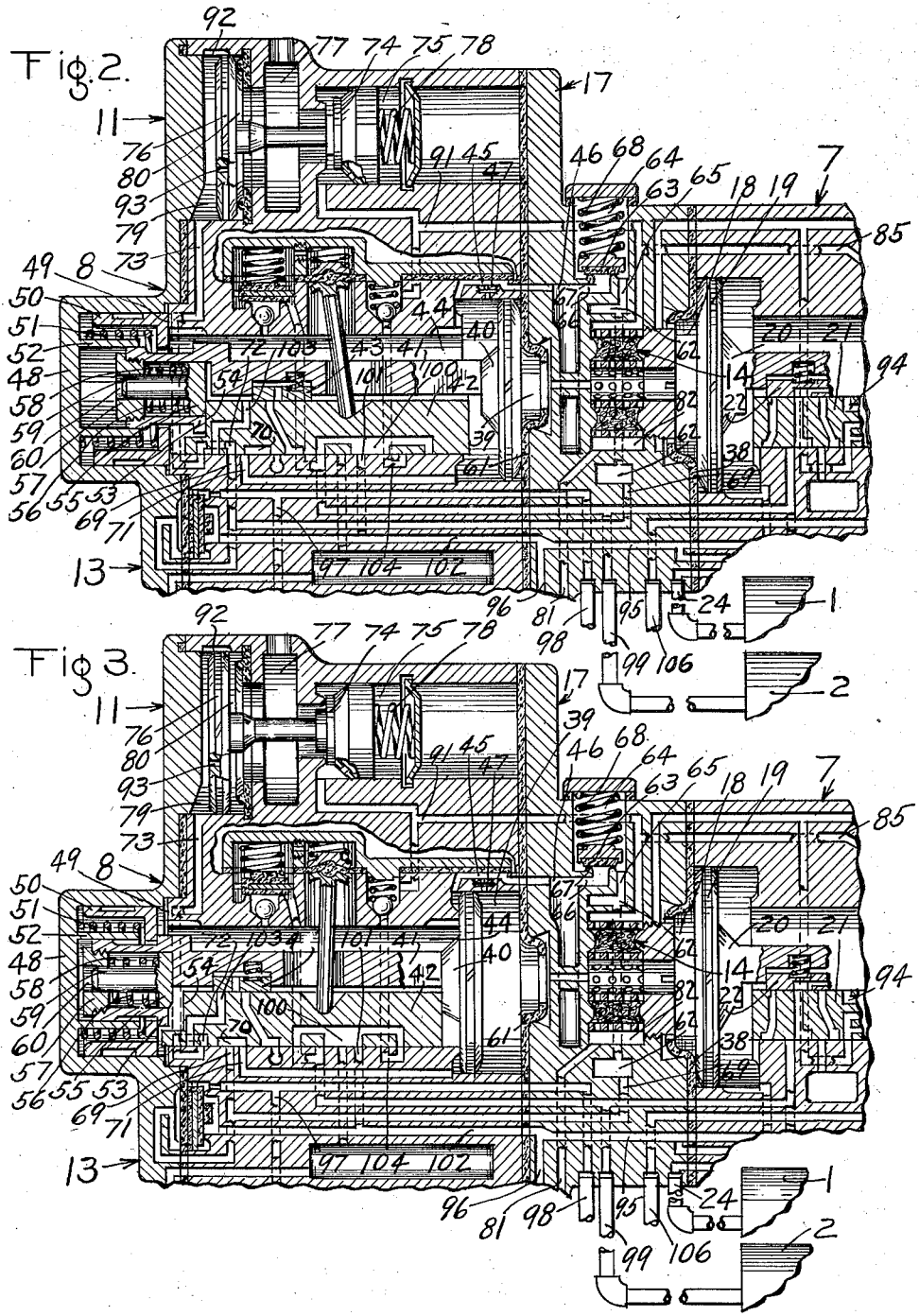

2,052,188

UNITED STATES PATENT OFFICE 2,052,188

FLUID PRESSURE BRAKE

Glenn T. McClure, Wilmerding, and Donald L. McNeal, Wilkinsburg, Pa., assignors to The Westinghouse Air Brake Company, Wilmerding, Pa., a corporation of Pennsylvania Application December 1, 1933, Serial No. 700,434

21 Claims. (Cl. 303—66)

This invention relates to fluid pressure brakes for controlling the application and release of the brakes and more particularly to an equipment of the type disclosed in Patent No. 2,031,213, issued to Clyde C. Farmer, on February 18, 1936.

The K type fluid pressure brake equipment, which has been standard for railway cars, was designed for handling trains of a length up to eighty cars. In recent years, however, there has been a constantly increasing tendency to operate trains exceeding eighty cars in length, and it has become increasingly difficult to obtain prompt and reliable application and release of the brakes on these longer trains.

In order to move the K type triple valve to release position to effect a release of the brakes, it is necessary to obtain a predetermined differential between brake pipe and auxiliary reservoir pressures acting on the opposite sides of the triple valve piston. This differential of pressures is readily obtained at the head end of the train where the rate of increase in brake pipe pressure is rapid, but as soon as the triple valve moves to release position communication is established through which fluid flows from the brake pipe to the auxiliary reservoir. This draining of air from the brake pipe to the auxiliary reservoir on cars at the head end of the train in addition to the resistance to flow of fluid under pressure through the brake pipe, retards the build up of brake pipe pressure at the rear end of the train, and in case the train is very long, slight leakage past the piston in the triple valve devices at the rear of the train will permit fluid under pressure to flow from the brake pipe to the auxiliary reservoirs at such a rate as to prevent obtaining a sufficient differential of pressures on said piston to move the triple valve devices to release position. Thus, under this condition of train length, the brake equipments at the rear end of the train may become recharged without releasing the brakes. This difficulty is greater in effecting a release of the brakes after an emergency application than after a service application, due to the higher pressure existing in the auxiliary reservoir after an emergency application, and at this higher auxiliary reservoir pressure it is more difficult to obtain the release differential than when the auxiliary reservoir pressure is lower, as after a full service application of the brakes.

The above difficulty of releasing the brakes after an emergency application has been eliminated by the new equipment, disclosed in the aforementioned Farmer patent, where each car in the train is equipped with the new equipment. This is accomplished by providing in the emergency portion of the equipment a back dump feature for venting fluid under pressure from the brake cylinder and auxiliary reservoir back into the brake pipe, so that the recharge of the brake pipe is accelerated and at the same time the auxiliary reservoir pressure is reduced to a low degree, which facilitates obtaining the required differential for operating the device to effect a release of the brakes.

This back dump operation is obtained by a rapid increase in pressure on the brake pipe side of the emergency piston, and since the opposite side of said piston is subject to substantially atmospheric pressure after an emergency application of the brakes, the piston promptly moves the valve elements to the back dump position. This operation is, of course, initiated at the first car in a train by the rapid increase in brake pipe pressure effected by operation of the usual brake valve device, but once initiated, the increase in brake pipe pressure effected by the back dump operation on one car causes the brake equipment on the next car to similarly operate, so that the back dump operation is transmitted serially from car to car throughout the length of the train, which ensures a release of all of the brakes on the train. It will be evident that, as in the older K type equipment, the movement of the emergency piston in the new equipment to facilitate releasing of brakes depends upon obtaining sufficient differential of pressures on the opposite sides of said piston, but this differential is readily obtained by the back dump operation when a train is equipped entirely with the new equipment.

With the brake equipment of the type disclosed in the aforementioned Farmer patent adopted by the railroads as standard, it is evident that there will be a transition period of some time, during which trains will comprise cars equipped with the old equipment as well as with the new. It will be evident that there will be innumerable combinations of these two different equipments, and it has been found, that in some combinations, such as in the case of a car furnished with the new equipment being at the rear end of a train otherwise furnished with the old equipment, the new equipment may not release much more readily than the old, since the release operation of both the old and new equipments depends upon the rate of increase in brake pipe pressure.

One object of our invention is to provide an improved fluid pressure brake equipment having means for obviating the above difficulty in effecting a release of the brakes after an emergency application.

In effecting an emergency application of the brakes with the equipment disclosed in the aforementioned Farmer patent, the vent valve device is operated to reduce brake pipe pressure to substantially that of the atmosphere, and then the vent valve closes.

With the old K type of brake equipment, when an emergency application of the brakes is effected, the vent valve operates to vent fluid under pressure from the brake pipe to the brake cylinder only until a predetermined pressure is obtained in the brake cylinder, and then the vent valve closes, so that considerable pressure is retained in the brake pipe.

In a train having some cars equipped with the old equipment and others with the new equipment, when an emergency application of the brakes is effected, there will be a flow of fluid retained in the brake pipe by operation of the old equipment, to that portion of the brake pipe which is completely vented by operation of the new equipment, and in some cases, the consequent increase in brake pipe pressures on the new equipment may be at such a rate as to move the emergency portion of the equipment to a position for closing communication from the emergency reservoir to the brake cylinder and thereby limit the brake cylinder pressure to less than desired in emergency, or the rate of increase in brake pipe pressure may even be such as to not only cut off the emergency reservoir from the brake cylinder, but also to effect back dump operation and thereby vent fluid under pressure from the brake cylinder and auxiliary reservoir back into the brake pipe. In either case, the pressure in the brake cylinder is less than the desired emergency value, which is very undesirable.

Another object of the invention is to provide an improved fluid pressure brake equipment having novel means for obviating the above difficulty in effecting an emergency application of the brakes.

This object is attained by providing means for retaining a pressure in the emergency slide valve chamber of such a degree as to exceed any pressure which might be built up in the brake pipe, on the opposite side of the emergency piston, by flow of fluid retained in the brake pipe, upon the emergency operation of the old equipment. This retained pressure in the emergency valve chamber acts to prevent undesired movement of the emergency valve device to the release and back dump positions upon an emergency application of the brake. The first mentioned object is attained by providing means which operates, when brake pipe pressure is increased over that retained in the emergency slide valve chamber, to reduce the pressure in said valve chamber so as to provide the required differential on the emergency piston to ensure its movement to back dump positions.

Other objects and advantages will be apparent from the following more detailed description of the invention.

In the accompanying drawings; Fig. 1 is a diagrammatic view, mainly in section, of a fluid pressure brake equipment embodying the invention, the various parts of the equipment being shown in normal release position; Fig. 2 is a similar view of a portion of the equipment in which the various parts are shown in emergency position; Fig. 3 is a view similar to Fig. 2, but showing the parts in the innermost or back dump position; and Fig. 4 is a diagrammatic, sectional view of a modified form of the invention.

As shown in the drawings, the fluid pressure brake equipment may be of the type disclosed in the aforementioned Farmer patent, which equipment comprises a brake controlling valve device, 10 an auxiliary reservoir 1, an emergency reservoir 2, a brake pipe 3, a combined cut-out cock and centrifugal dirt collector 4, a brake cylinder 5 and a pressure retaining valve device 6.

The brake controlling valve device comprises a triple valve device 7, an emergency valve device 8, a release ensuring valve device 9, a quick service modifying or limiting valve device 10, a brake pipe vent valve device 11, an emergency inshot valve device 12, a timing valve device 13, a strainer device 14, a double check valve device 15, and a reservoir release valve device 16, all of said valve devices being carried by a pipe bracket 17.

With the exception of the emergency valve device 8 and pipe bracket 17, the various parts and devices of the equipment are of substantially the same construction and function in substantially the same manner, in controlling the application and the release of the brakes, as the corresponding parts and devices of the equipment disclosed in the aforementioned Farmer patent. Due to this, and for the purpose of simplifying this specification, a detailed description of the various functions and details of construction of the equipment will be omitted.

The triple valve device 7 comprises a casing having a chamber 18 containing a piston 19 provided with a stem 20 adapted to operate a main slide valve 21 and an auxiliary slide valve 22 contained in a valve chamber 23 which is connected through a pipe and passage 24 to the auxiliary reservoir 1.

The valve chamber 23 is closed at one end by a cap 25 which has a recess formed therein and which defines the rear end portion of the valve chamber. This recess is of greater diameter than the major portion of the valve chamber 23 and due to this, the rear end of the triple valve casing forms a stop shoulder 26 against which a stop member 27, slidably mounted in the cap 25, is adapted to abut to limit inward movement of the stop member 27. Interposed between the cap 25 and the stop member 27, is a spring 28 which, at all times, tends to move the stop member 27 against the shoulder 26.

The rear end portion of the piston stem 20 extends through a central opening in the stop member 27 and is slidably guided in an annular lug 29 carried by the cap 25. The piston stem 20, at a point located a short distance inwardly from its rear end, is provided with an operating collar or lug 30, one side of which is adapted to be engaged by the stop member 27 and the other side of which is adapted to operatively engage a rear end surface 31 of the main slide valve 21.

The rear end portion of the stem 20 is provided with a bore 32 which is closed at one end by a plug 33 having screw-threaded connection with the stem, said plug being provided with a central bore 34. Below the lower surface of the major portion of the piston stem 20, the other end of the bore 32 is open. The inner end wall of the bore 32 forms a stop shoulder adapted to be engaged by a plunger 35 which is slidably mounted in the bore 32. This plunger is provided with a stem 36 which is slidably guided by the plug 33 within the bore 34.

Interposed between and engaging one side of the plunger 35 and plug 33 is a spring 37 which acts to normally maintain the plunger in engagement with the end wall of the bore 32. In this position, the face of the plunger will be closer to the rear face 31 of the main slide valve 21 than will be the outer face of the collar 30 of the piston stem, so that in effecting an application of the brakes, the plunger 35 will engage the main slide valve 21 and yieldably resist movement of the piston 19 and auxiliary slide valve 22 relative to the main slide valve 21 before the collar 31 engages the main slide valve. The purpose of this, as fully described in the aforementioned Farmer patent, is to stabilize the action of the triple valve parts. This stabilizing mechanism also acts to assist in breaking the seal between the triple valve piston 19 and a sealing gasket 38, clamped between the pipe bracket 17 and the casing of the triple valve device 7, in effecting a release of the brakes, and further serves as a graduating spring for shifting the piston 9 and thereby the auxiliary slide valve 22 to service lap position.

The emergency valve device 8 comprises a casing having a piston chamber 39 containing an emergency piston 40 provided with a stem 41 adapted to operate a main slide valve 42 and an auxiliary slide valve 43 contained in a valve chamber 44 which is connected, through a passage 45, with one portion 46 of a quick action chamber which is formed in the pipe bracket 17. The piston chamber 39 is normally open, through a choke plug 47, to the passage 45.

A cap 48 is secured to the rear end of the casing of the emergency valve device and has an annular recess formed therein which constitutes a portion of the emergency valve chamber 44. This recess is of greater diameter than that of the major portion of the valve chamber 44, and due to this, the rear end of the casing forms a stop shoulder 49 against which a stop member 50, slidably mounted in the cap 48, is adapted to abut to limit inward movement of the member 50. Interposed between and engaging the cap 48 and member 50 is a spring 51 which, at all times, tends to move the member 50 toward the stop shoulder 49.

The rear end portion of the emergency piston stem 41 extends through a central opening in the member 50 and is slidably guided in an annular lug 52 carried by the cap 48.

The piston stem 41, at a point located a short distance inwardly from its rear end, is provided with an operating collar or lug 53, one side of which is adapted to be operatively engaged by the stop member 50, and the other side of which is adapted to operatively engage a rear end surface 54 of the main slide valve 42.

The rear end portion of the emergency piston stem 41 carries a mechanism which, in construction, is quite similar to the stabilizing mechanism carried by the rear end of the triple valve piston stem 20, and comprises a plunger 55 which is subject to the pressure of a spring 56 interposed between and engaging the plunger and a plug 57 having screw-threaded connection with the stem 41. This plunger is slidably guidable within a bore 58 provided in the piston stem, and has a stem 59 which is slidable within a bore 60 in the plug 57. This mechanism is adapted to cooperate with the main slide valve 42 to assist in shifting the emergency piston 41 out of sealing engagement with a gasket 61 in releasing the brakes after an emergency application.

According to the invention, the quick action chamber of the emergency valve device 8 is divided into two parts or chambers, the part or chamber 46 which is at all times in communication with the slide valve chamber 44 and another part or chamber 62 which is also formed in the bracket 17. A check valve 63 is contained in a chamber 64 formed in the bracket 17, said chamber communicating with chamber 62 through a passage 65 and with chamber 46 through a passage 66. A seat rib 67 is provided on the bracket 17 within the check valve chamber 64 surrounding the opening of passage 66 into said chamber, and a spring 68 contained in said chamber acts on the check valve 63 for, under certain conditions, holding said check valve in engagement with the seat rib 67 so as to prevent flow of fluid under pressure from chamber 46 to chamber 62, the pressure of said spring being of a predetermined or critical value. The chamber 62 is connected to a passage 69 leading to the seat of the main slide valve 42. This passage 69 is connected through a cavity 70 in the slide valve 42 to a passage 71 leading to the valve chamber 44 and thereby to the portion 46 of the quick action chamber, when the emergency valve device 8 is in the release position, as shown in Fig. 1 of the drawings, so that portions 46 and 62 of the quick action chamber normally form in effect a single chamber, but when the emergency valve device is in emergency position this communication between the two portions 46 and 62 of the quick action chamber is closed, and the portion 62 is connected through the passage 69, a cavity 72 in the slide valve 42 and a passage 73 to the brake pipe vent valve device 11.

The brake pipe 3 is normally open through the combined cutout cock and dirt collector 4 to a passage 81 leading to a chamber 82 in the pipe bracket. This chamber 82 is open through the straining material of the strainer device 14 to the triple valve piston chamber 18 and emergency valve piston chamber 39. If the strainer device 14 should become clogged, the double check valve device 15 is adapted to by-pass fluid under pressure around said strainer device in the same manner as fully described in aforementioned Farmer application.

The release ensuring valve device 9 is for the purpose of venting fluid under pressure from the auxiliary reservoir 1 when, in effecting a release of the brakes, the brake pipe pressure is increased to a predetermined degree in excess of that in the auxiliary reservoir, so as to facilitate the movement of the triple valve piston 19 to release position. Briefly described, this device comprises a flexible diaphragm 83 having at one side a chamber 84 open by way of the double check valve device 15 and a passage 85 to the chamber 82 and consequently to the brake pipe 3, and having at the opposite side a chamber 86 open through a passage 87 to the valve chamber 23 of the triple valve device. Contained in the chamber 86 is a valve 88 which is operative to control communication from said chamber to a vent passage 89 leading to the seat of the main slide valve 21 of the triple valve device, the valve 88 being normally maintained closed by a spring 90. The flexible diaphragm 83 is subjected, as will be understood, to the opposing pressures of the brake pipe and auxiliary reservoir and is operable to control the operation of the valve 88.

The brake pipe vent valve device 11 comprises a vent valve 74 contained in a chamber 75 which is in constant communication with the brake pipe chamber 82 by way of passage 91, and also comprises a piston 76 adapted to control the operation of the vent valve 74 to open and close a communication from the chamber 75 to a chamber 77 which is open to the atmosphere, said valve being normally closed by the action of a coil spring 78. At one side of the piston 76 there is formed a chamber 79 connected to passage 73 leading to the seat of the emergency slide valve 42, while at the opposite side of said piston there is a chamber 80 open to the atmospheric chamber 77.

With the vent valve piston 76 in its normal position, as shown in the drawings, the piston chamber 79 is open to the atmosphere through a leakage groove 92 around the piston and also by way of a small port 93 in the piston. The purpose of the small port 93 is to control the rate of flow of actuating fluid from chamber 79 in effecting an emergency application of the brakes so as to ensure that the vent valve 74 will remain open for a predetermined period of time. The leakage groove 92 provides for a fairly rapid discharge of fluid from the piston chamber 79, so as to prevent the development of sufficient pressure in said chamber to cause the piston 76 to move to its valve unseating position in the event of leakage of fluid under pressure to the chamber 79 by way of passage 73.

The inshot valve device 12 is preferably contained in the casing of the emergency valve device 8 and functions in effecting an emergency application of the brakes to provide an initial inshot of fluid to the brake cylinder until a predetermined brake cylinder pressure is developed, and then it functions to restrict the rate of flow of fluid to the brake cylinder.

The timing valve device 13 is preferably associated with the inshot valve device 12 and operates, in effecting an emergency application of the brakes, to open communication between passages 102 and 98 through which a final inshot of fluid to the brake cylinder is provided a predetermined time after the inshot valve device 12 operates to retard the flow of fluid to the brake cylinder.

The quick service modifying or limiting valve device 10 is preferably associated with the triple valve device 7 and is for the purpose of limiting the local quick service reduction in brake pipe pressure according to a predetermined increase in brake cylinder pressure to ensure the development of a predetermined but light brake cylinder pressure upon a light reduction in brake pipe pressure, so as to prevent the slack in the train from running in harshly.

The reservoir release valve device 16 is carried by the casing of the triple valve device and is manually operative to vent fluid from the auxiliary reservoir 1 or from both the auxiliary reservoir 1 and emergency reservoir 2 to effect a release of the brakes independently of the usual engineer's brake valve device, under certain train operating conditions.

The retaining valve device 6 may be of the usual construction having a cut-out position in which fluid under pressure is adapted to be completely vented from the brake cylinder, and a cut-in position in which it operates to retain a predetermined pressure in the brake cylinder.

The foregoing description has been limited more or less to the details of the various parts of the equipment and the following description will be directed more particularly to the functioning of said parts in controlling the brakes.

It will be here understood, that with the exception of effecting an emergency application of the brakes and a release of the brakes after an emergency application, the equipment functions to control the brakes in the same manner as the equipment which is fully described and broadly claimed in the aforementioned Farmer patent, and in view of this, the following description of operation will be confined to the operations of the equipment which differ from those described in the Farmer patent.

With the equipment in the normal release position, as shown in Fig. 1 of the drawings, the portion 62 of the quick action chamber is connected through passage 69, cavity 70 in the emergency slide valve 42 and passage 71 to the emergency slide valve chamber 44 and the portion 46 of the quick action chamber, which portion is in constant communication with said valve chamber through passage 45, so that with the equipment fully charged, both portions of the quick action chamber are charged with fluid under pressure from the slide valve chamber 44.

To effect an emergency application of the brakes, a sudden reduction in pressure is effected in the brake pipe 3 and consequently in the triple valve piston chamber 18 and emergency valve piston chamber 39 which causes the triple valve device 7 to move to application position and the emergency valve device 8 to move to emergency position, which positions are shown in Fig. 2 of the drawings.

In these positions of the triple valve device and emergency valve device, fluid under pressure is supplied from both the auxiliary reservoir 1 and emergency reservoir 2 to the brake cylinder 5, the flow of fluid from the auxiliary reservoir 1 being by way of pipe and passage 24, valve chamber 23 of the triple valve device, a service port 94 in the main slide valve 21, a passage 95, a branch passage 96, through the emergency inshot valve device 12, a passage 97 and a passage and pipe 98. The flow of fluid from the emergency reservoir 2 to the passage 96 and consequently to the brake cylinder 5 is by way of a pipe and passage 99, a cavity 100 in the emergency slide valve 42, and passages 101 and 102. When the timing valve device 13 is operated, there is an additional flow of fluid from the auxiliary reservoir 1 and emergency reservoir 2 to the brake cylinder 5 by way of passage 102, and through said timing valve device to passage and pipe 98 leading to the brake cylinder.

When, in effecting an emergency application of the brakes, the emergency piston 40 moves towards emergency position, it initially moves the auxiliary slide valve 43 on the main slide valve 42 until the lug 53 on the end of the piston stem 41 engages the surface 54 on the end of the main slide valve 42. In this position, a port 103 in the main slide valve is uncovered which permits fluid under pressure to flow from valve chamber 44 to passage 73 leading to the vent valve piston chamber 79. Further movement of the piston 40 then moves the main slide to emergency position. This movement of the main slide valve first disconnects passage 71 leading to the emergency valve chamber 44 from passage 69 leading to the portion 62 of the quick action chamber, thereby closing communication through the slide valve between the two portions 46 and 62 of the quick action chamber, and at substantially the same time, the port 103 is moved out of registry with passage 73, which cuts off the flow of fluid from the valve chamber 44 and the portion 46 to the vent valve piston chamber 79. When the slide valve 42 reaches emergency position, as shown in Fig. 2 of the drawings, the cavity 72 in said slide valve connects passages 69 and 73, so that fluid under pressure is permitted to flow from the portion 62 of the quick action chamber to the vent valve piston chamber 79.

The fluid under pressure thus supplied to the vent valve piston chamber 79, operates the vent valve piston 76 to unseat the vent valve 74 which permits a rapid flow of fluid under pressure from the brake pipe 3 for propagating serially, the emergency action through the train in the usual manner.

With the vent valve piston 76 in the venting position, fluid supplied to the chamber 79 gradually flows through the port 93 to the atmosphere, thereby reducing the pressure in the portion 62 of the quick action chamber. When the pressure in this chamber acting on the spring side of the check valve 63 is reduced a predetermined degree below the pressure in the valve chamber 44 and portion 46 of the quick action chamber acting within the seat rib 67 on the opposite side of said check valve, said check valve is pushed from its seat which permits fluid under pressure to flow from chambers 44 and 46 to chamber 62 and from thence to the atmosphere through port 93 in the vent valve piston 76.

This supply of fluid to the vent valve piston is adapted to hold the vent valve 74 unseated for a predetermined period of time. When the pressure acting on the vent valve piston becomes reduced, due to flow through port 93, to a degree below the pressure of spring 78, said spring acts to seat the vent valve 74 and return the piston 76 to its normal position, in which the leakage groove 92 is opened in addition to the port 93. Through this leakage groove and port, the fluid under pressure is completely vented from the portion 62 of the quick action chamber, and the pressure of fluid in the valve chamber 44 and portion 46 of the quick action chamber reduces, by flow past the check valve 63, to a degree corresponding to the pressure of spring 68, at which time said spring acts to seat the check valve 63 and thereby hold the remaining fluid under pressure in the valve chamber 44 and connected portion 46 of the quick action chamber.

This holding of a predetermined pressure, such as twenty pounds, in the valve chamber 44 is one feature of the invention, and it is adapted to hold the emergency piston in the emergency position against any increase in brake pipe pressure which might be obtained in piston chamber 39 due to the flow of fluid from a portion of the brake pipe to which old K type equipments are connected and which equipments do not operate, in effecting an emergency application of the brakes, to completely vent the fluid under pressure from the brake pipe, as do the new brake equipments. Due to this feature, the possibility of undesired movement of the emergency valve from emergency position to the normal or to the back dump position, which will hereinafter be described, is prevented in a train comprising cars equipped with this new equipment and other cars equipped with the old equipment.

It will be understood that this feature of holding fluid under pressure in the emergency valve chamber in effecting an emergency application of the brakes, is necessary to prevent undesired back dump operation only when the new equipment is used in trains also containing old equipment of the K type, but it is not necessary, though not objectionable, in a train in which all of the cars are equipped with apparatus having the operating characteristics of the new equipment.

To effect a release of the brakes after an emergency application, fluid under pressure is supplied to the brake pipe 3 in the usual manner and flows to the triple valve piston chamber 18 and the emergency valve piston chamber 39. Fluid in the valve chamber 33 of the triple valve device is at reduced auxiliary reservoir pressure and fluid held in the valve chamber 44 may be at some low pressure, such as twenty pounds, which is much lower than reduced auxiliary reservoir pressure, which may be sixty pounds or more.

When the brake pipe pressure is increased to substantially the pressure held in the emergency valve chamber 44 and connected portion 46 of the quick action chamber, the spring 56 carried in the end of the piston stem 41 and acting through plunger 55 on the surface 54 of the main slide valve is adapted to pull the piston 40 away from the gasket 61, and then when the pressure in piston chamber 39 slightly exceeds that in the valve chamber 44, said piston moves into engagement with the front end of the main slide valve 42 and moves said slide valve inwardly to the normal position, in which position the collar 53 on the piston stem 41 engages the stop member 50. In this position, cavity 70 connects passage 71, leading to the slide valve chamber 44, to passage 69 leading to the portion 62 of the quick action chamber. Since the portion 62 of the quick action chamber is vented to the atmosphere, when the emergency valve device is in emergency position, the connecting of the valve chamber 44 and portion 46 of the quick action chamber to the portion 62 of said chamber permits rapid flow of fluid under pressure to the portion 62. This quickly reduces the pressure in valve chamber 44 to below the brake pipe pressure acting on the opposite side of the emergency piston, thereby promptly establishing sufficient differential of pressures on said piston to move the slide valve 42 past the normal position to the inner or back dump position against the opposing pressure of spring 51 acting on the stop member 50, this back dump position being shown in Fig. 3 of the drawings.

Leakage of fluid from the brake pipe past the emergency valve piston 40 to the valve chamber 44 before the slide valve 42 is moved from emergency position, will not increase the pressure retained in valve chamber 44 and thereby affect the movement of said slide valve to back dump position, since such leakage will be dissipated past the check valve 63 to the portion 62 of the quick action chamber when the pressure in valve chamber 44 acting on said check valve exceeds the opposing pressure of spring 68, and since the portion 62 of the quick action chamber is open to the atmosphere through the emergency slide valve 42, when said slide valve is in emergency position, said portion of the quick action chamber is maintained at substantially atmospheric pressure until the slide valve 42 moves to the normal position, thereby ensuring the reduction in pressure in valve chamber 44 for moving the emergency valve device to back dump position.

With the various parts of the emergency valve device in the inner or back dump position, as shown in Fig. 3 of the drawings, the cavity 100 in the main slide valve 42 connects the passage 101 to a passage 104 which is open, through passage 91, to the strainer chamber 82 and consequently to the brake pipe 3. With this communication established, fluid under pressure flows from the auxiliary reservoir 1 and brake cylinder 5 to the brake pipe, the flow of fluid from the brake cylinder to the passage 104 being by way of pipe and passage 98, through the timing valve device 13 and passage 102. The triple valve device 7 still being in application position, the flow of fluid from the auxiliary reservoir 1 to the passage 101 is by way of pipe and passage 24, valve chamber 23 in the triple valve device, service port 94 in the main slide valve 21, and passages 95 and 102. This back dump action permits substantial equalization of the pressures in the brake cylinder and auxiliary reservoir into the brake pipe and effects several desirable results: first, it serves to save fluid under pressure which otherwise would be lost to the atmosphere; secondly, it rapidly increases brake pipe pressure which acts to hasten the recharge of the equipment on a train and thereby obtain a quicker release of the brakes on the train after an emergency application; and further, by reducing auxiliary reservoir pressure to a low degree, it facilitates operation of the triple valve device to effect a release of the brakes.

When in releasing the brakes, the brake pipe pressure in chamber 84, at one side of the flexible diaphragm 83 of the release ensuring valve device 9, exceeds the auxiliary reservoir pressure in chamber 86 at the opposite side of said diaphragm by about one and one-half pounds, said diaphragm is flexed toward the right hand and unseats the valve 88. It is intended that when the brake pipe pressure exceeds auxiliary reservoir pressure by about one and one-quarter pounds, the triple valve piston 19 will move the slide valves 21 and 22 from application position, as shown in Fig. 2, to release position, as shown in Fig. 1, so that the main slide valve 21 will lap the passage 89. With the passage 89 lapped, the opening of valve 88 will not vent fluid under pressure from the chamber 86 and consequently from the triple valve chamber 23 and connected auxiliary reservoir 1. If, however, a greater differential is required to move the triple valve device to release position than is required to unseat the valve 88, fluid under pressure will be permitted to flow from the triple valve chamber 23 and auxiliary reservoir 1 past said valve to passage 89 and from thence through a cavity 105 in the slide valve 21, passage and pipe 106 and from thence to the atmosphere. This venting of fluid from the triple valve chamber 23 will continue until the pressure in said chamber is reduced sufficiently below brake pipe pressure acting on the opposite side of said piston to cause said piston to move and shift the slide valves 21 and 22 to release position, in which passage 89 is lapped to prevent further venting of fluid under pressure from the valve chamber 23 and auxiliary reservoir 1 by way of the unseated valve 88.

With the triple valve parts in release position, the cavity 105 connects the brake cylinder passage 95 to passage 106, leading to the retaining valve device 6 and from thence to the atmosphere, and fluid flows from the brake cylinder through this communication to the atmosphere, thereby releasing the brakes.

In Fig. 4 of the drawings is shown a modified form of the invention, which is adapted to operate to prevent undesired back dump operation when effecting an emergency application of the brakes in substantially the same manner as that form shown in Fig. 1, but this modified form is also adapted to operate to ensure back dump operation of the emergency valve device under more severe conditions of leakage past the emergency valve piston 40 and upon a slower increase in brake pipe pressure, than is the apparatus shown in Fig. 1.

According to the modification shown in Fig. 4, a valve piston 112 is provided to control communication between passages 66 and 65 leading to the portions 46 and 62, respectively, of the quick action chamber. A chamber 107 at the back of the valve piston 112 is open to the atmosphere through a passage 108, and a spring 109 contained in the chamber 107 acts to urge the valve piston 112 into engagement with the seat rib 67.

In operation, when the brake equipment is fully charged with fluid under pressure, the valve piston 112 is held in sealing engagement with a gasket 110 by the pressure of fluid in the portions 46 and 62 of the quick action chamber, which portions are connected by ways of passage 71, cavity 70 and passage 69, as shown in Fig. 1 of the drawings.

When an emergency application of the brakes is effected and fluid under pressure is vented from the portion 62 of the quick action chamber, through passage 69 cavity 72 in slide valve 42 and passage 73 to the vent valve piston chamber 79 for effecting operation of the vent valve device 11, fluid under pressure flows from the portion 46 of the quick action chamber to the portion 62 and from thence to the vent valve device until the pressure of fluid acting below the valve piston 112 is overcome by the pressure of spring 109, whereupon said spring shifts the valve piston 112 into engagement with the seat rib 67, so as to prevent further flow of fluid under pressure from the emergency valve chamber 44. The pressure in the portion 62 of the quick action chamber then continues to reduce through the vent valve device 11 to atmospheric pressure as hereinbefore described.

The valve piston 112 and spring 109 are so proportioned as to retain in the valve chamber 44 and portion 46 of the quick action chamber substantially the same pressure as retained by action of the check valve 63 in the construction shown in Fig. 1, so as to hold the emergency valve piston 40 and other parts in the emergency position against any possible undesired increase in pressure which might be obtained in the brake pipe and thereby in the emergency piston chamber 39 in effecting an emergency application of the brakes, as has been fully described hereinbefore.

In effecting a release of the brakes after an emergency application, as hereinbefore described, the apparatus may operate in the same manner as that shown in Fig. 1, that is, the portion 62 of the quick action chamber is maintained vented until the emergency slide valve 42 is moved to normal position, whereupon said vented portion is connected to the partially charged portion 46 of the quick action chamber. Through this communication, the pressure in the portion 46 and in valve chamber 44 quickly equalizes into the portion 62, thereby establishing sufficient differential of pressures on the emergency piston 40 to promptly shift said piston to the inner or back dump position. Then when the two portions of the quick action chamber become charged to a pressure, which, acting on the lower face of valve piston 112, overcomes the opposing pressure of spring 109, said valve piston is moved into engagement with the gasket 110.

In case there is leakage of fluid under pressure past the emergency valve piston 40 from the brake pipe to the valve chamber 44 at such a rate as to permit the pressure in said chamber to increase at substantially the same rate as brake pipe pressure, as might occur in the case of a very slow increase in brake pipe pressure for instance at the rear end of a very long train, then it will be evident that a sufficient differential of pressures on the emergency piston 40 to move the slide valve 42 to normal position might not be obtained. Under such a condition, when the pressure in valve chamber 44 and portion 46 of the quick action chamber becomes increased, due to leakage past piston 40, to a predetermined degree, this pressure acting on the valve piston 112 within the seat rib 67, overcomes the opposing pressure of spring 109 and moves said valve piston away from said seat rib. As the valve piston 112 leaves the seat rib 69, the pressure of fluid acts over the full area of the valve piston and promptly moves it into engagement with gasket 110. This operation of valve piston 112 permits fluid under pressure to flow from the valve chamber 44 and portion 46 of the quick action chamber into the portion 62 of said chamber, thereby reducing the pressure in valve chamber 44 and establishing the required differential of pressures on the emergency piston 40 to cause said piston to promptly operate and shift the slide valve 42 through the normal position to the inner or back dump position for effecting the back dump operation, as fully described in connection with the apparatus illustrated in Fig. 1.

From the above description it will be seen that we have provided an emergency valve device having means which will function, when an emergency application of the brakes is effected, to prevent undesired movement of the emergency valve device from emergency position by an increase in brake pipe pressure which may be caused by the flow of fluid from the brake pipe of the old or K type equipment to the brake pipe of the new, and which will function, in effecting a release of the brakes after an emergency application, to ensure movement of the emergency valve device to its inner or back dump position regardless of the rate of increase in brake pipe pressure.

The subject matter relating to the feature of preventing the emergency valve device from being moved to its back dump position is broadly claimed in an application of Ellis E. Hewitt, Serial No. 639,797, filed October 27, 1932.

While several illustrative embodiments of the invention have been described in detail, it is not our intention to limit its scope to these embodiments or otherwise than by the terms of the appended claims.

Having now described our invention, what we claim as new and desire to secure by Letters Patent, is:

1. In a fluid pressure brake, the combination with a brake pipe, of an emergency valve device subject to the opposing pressures of the brake pipe and a chamber and operated upon an emergency reduction in brake pipe pressure for initiating an emergency operation, means operated upon an emergency movement of said valve device for reducing the fluid pressure in said chamber, and valve means for limiting the reduction in pressure in said chamber to a predetermined degree.

2. In a fluid pressure brake, the combination with a brake pipe, of an emergency valve device subject to the opposing pressures of the brake pipe and a chamber and having a release position and movable upon an emergency reduction in brake pipe pressure for initiating an emergency operation, valve means operative upon the emergency movement of said valve device for reducing the fluid pressure in said chamber, and means for limiting the reduction in pressure in said chamber to a predetermined degree, said valve means being operative upon an increase in brake pipe pressure, to a pressure exceeding said predetermined degree, to effect a reduction in said predetermined degree of pressure.

3. In a fluid pressure brake, the combination with a brake pipe, of an emergency valve device subject to the opposing pressures of the brake pipe and a chamber and having a release position and movable upon an emergency reduction in brake pipe pressure for initiating an emergency operation, valve means operative upon the emergency movement of said valve device for reducing the fluid pressure in said chamber, and means for limiting the reduction in pressure in said chamber to a predetermined degree, said valve means being operative upon movement toward release position upon an increase in brake pipe pressure to effect a reduction in said predetermined degree of pressure.

4. In a fluid pressure brake, the combination with a brake pipe and a brake cylinder, of an emergency valve mechanism movable upon an emergency reduction in brake pipe pressure to an emergency position in which fluid under pressure is supplied to said brake cylinder, and movable upon an increase in brake pipe pressure to a brake cylinder venting position in which fluid under pressure is vented from said brake cylinder, said valve mechanism comprising valve means and a movable abutment subject to the opposing pressures of the brake pipe and a chamber for actuating said valve means, and means for insuring a predetermined fluid pressure in said chamber for preventing movement of said abutment to the brake cylinder venting position until brake pipe pressure exceeds said predetermined fluid pressure.

5. In a fluid pressure brake, the combination with a brake pipe and brake cylinder, of an emergency valve mechanism movable upon an emergency reduction in brake pipe pressure to an emergency position in which fluid under pressure is supplied to said brake cylinder, and movable upon an increase in brake pipe pressure to a brake cylinder venting position in which fluid under pressure is vented from said brake cylinder, said valve mechanism comprising valve means and a movable abutment subject to the opposing pressures of the brake pipe and a chamber for actuating said valve means, and means operative regardless of leakage from the brake pipe past said abutment to said chamber for insuring a predetermined fluid pressure in said chamber for preventing movement of said abutment to the brake cylinder venting position until brake pipe pressure exceeds said predetermined fluid pressure.

6. In a fluid pressure brake, the combination with a brake pipe and a brake cylinder, of an emergency valve mechanism movable upon an emergency reduction in brake pipe pressure to an emergency position in which fluid under pressure is supplied to said brake cylinder, and movable upon an increase in brake pipe pressure to a brake cylinder venting position in which fluid under pressure is vented from said brake cylinder, said valve mechanism comprising valve means and a movable abutment subject to the opposing pressures of the brake pipe and a chamber for actuating said valve means, and means for insuring a predetermined fluid pressure in said chamber for preventing movement of said abutment to the release position until brake pipe pressure exceeds said predetermined fluid pressure, said means being operative in case of leakage from the brake pipe past said abutment to said chamber, upon an increase in brake pipe pressure to reduce the pressure of fluid in said chamber.

7. In a fluid pressure brake, the combination with a brake pipe, of a piston subject to the opposing pressures of the brake pipe and a chamber, and valve means movable by said piston to one position upon a reduction in brake pipe pressure below the pressure in said chamber and movable by said piston to another position when the brake pipe pressure exceeds the pressure in said chamber, and a valve device subject to the pressure in said chamber and operative, in case of leakage of fluid from the brake pipe past said piston to said chamber, and regardless of the rate of said leakage, when the pressure in said chamber is increased to a predetermined degree, upon an increase in brake pipe pressure, to reduce the pressure in said chamber below brake pipe pressure and thereby effect movement of said piston and valve means to said other position.

8. In a fluid pressure brake, the combination with a brake pipe, of a piston subject to the opposing pressures of the brake pipe and a chamber, and valve means movable by said piston to one position upon a reduction in brake pipe pressure below the pressure in said chamber and movable by said piston to another position when the brake pipe pressure exceeds the pressure in said chamber, and a valve subject on one side to the pressure in said chamber and open at the opposite side to atmosphere, a spring acting on said opposite side of said valve, said valve being operative when the pressure in said chamber exceeds the value of said spring to open a communication to said chamber through which the pressure of fluid in said chamber is adapted to be reduced to below brake pipe pressure for effecting operation of said piston to move said valve means to said other position, said valve means being operative to close said communication in said other position.

9. In a fluid pressure brake, the combination with a brake pipe, a brake cylinder, and an emergency valve device controlled by the opposing pressures of the brake pipe and a chamber normally charged with fluid under pressure from said brake pipe, and operative upon an emergency reduction in brake pipe pressure to supply fluid under pressure to said brake cylinder and to vent fluid under pressure from said chamber independently of the supply of fluid under pressure to said brake cylinder and operative upon an increase in brake pipe pressure over the pressure in said chamber to vent fluid under pressure from said brake cylinder, and means operative to limit said venting of fluid under pressure from said chamber and thereby hold a predetermined pressure in said chamber.

10. In a fluid pressure brake, the combination with a brake pipe, a brake cylinder, and an emergency valve device controlled by the opposing pressures of the brake pipe and a chamber normally charged with fluid under pressure from said brake pipe, and operative upon an emergency reduction in brake pipe pressure to supply fluid under pressure to said brake cylinder to effect an emergency application of the brakes, and to vent fluid under pressure from said chamber, and operative upon an increase in brake pipe pressure over the pressure in said chamber to vent fluid under pressure from said brake cylinder, and valve means controlling the communication through which fluid under pressure is vented from said chamber and operative in effecting an emergency application of the brakes to close said communication when the pressure in said chamber is reduced to a predetermined degree.

11. In a fluid pressure brake, the combination with a brake pipe, a brake cylinder, and an emergency valve device controlled by the opposing pressures of the brake pipe and a chamber normally charged with fluid under pressure from said brake pipe, and operative upon an emergency reduction in brake pipe pressure to supply fluid under pressure to said brake cylinder and to vent fluid under pressure from said chamber and operative upon an increase in brake pipe pressure over the pressure in said chamber to vent fluid under pressure from said brake cylinder, and means for limiting the reduction in pressure in said chamber to a predetermined degree, said emergency valve device being operative when the pressure in the brake pipe is increased above the pressure in said chamber to vent fluid under pressure from said chamber.

12. In a fluid pressure brake, the combination with a brake pipe, a brake cylinder, and an emergency valve device controlled by the opposing pressures of the brake pipe and a chamber normally charged with fluid under pressure from said brake pipe, and operative upon an emergency reduction in brake pipe pressure to supply fluid under pressure to said brake cylinder and to vent fluid under pressure from said chamber and operative upon an increase in brake pipe pressure over the pressure in said chamber to vent fluid under pressure from said brake cylinder, and means for limiting the reduction in pressure in said chamber to a predetermined degree, said emergency valve device being operative when the pressure in the brake pipe is increased above the pressure in said chamber to vent fluid under pressure from said chamber, said means being operative upon an increase in brake pipe pressure to prevent an increase in pressure in said chamber until the operation of said emergency valve device upon an increase in brake pipe pressure over the pressure in said chamber.

13. In a fluid pressure brake, the combination with a brake pipe, a brake cylinder, and an emergency valve device controlled by the opposing pressures of the brake pipe and a chamber normally charged with fluid under pressure from said brake pipe, and operative upon an emergency reduction in brake pipe pressure to supply fluid under pressure to said brake cylinder and to vent fluid under pressure from said chamber and operative upon an increase in brake pipe pressure over the pressure in said chamber to vent fluid under pressure from said brake cylinder, and means operative to limit said venting of fluid under pressure from said chamber and thereby hold a predetermined pressure in said chamber, said means being operative when the brake pipe pressure is increased to substantially the degree of pressure held in said chamber to effect a rapid reduction in pressure in said chamber.

14. In a fluid pressure brake, the combination with a brake pipe, a brake cylinder, and an emergency valve device controlled by the opposing pressures of the brake pipe and a chamber normally charged with fluid under pressure from said brake pipe, and operative upon an emergency reduction in brake pipe pressure to supply fluid under pressure to said brake cylinder and to vent fluid under pressure from said chamber and operative upon an increase in brake pipe pressure over the pressure in said chamber to vent fluid under pressure from said brake cylinder, and means operative to limit said venting of fluid under pressure from said chamber and thereby hold a predetermined pressure in said chamber, said means being operative when the brake pipe pressure is increased to a predetermined degree, and regardless of the rate of said increase, to effect a rapid reduction in pressure in said chamber.

15. In a fluid pressure brake, the combination with a brake pipe, a brake cylinder, and an emergency valve device comprising valve means having an emergency position for supplying fluid under pressure to said brake cylinder and another position for venting fluid under pressure from said brake cylinder, a movable abutment subject at all times to the opposing pressures of the brake pipe and a chamber and operative according to the differential of pressures established between said brake pipe and chamber for positioning said valve means, the differential of pressures to move said valve means to the first mentioned position being provided by effecting an emergency reduction in brake pipe pressure, and valve means operative, when the pressure in said brake pipe is increased, to ensure the building up of a differential of pressures sufficient to move said valve means to the brake cylinder venting position.

16. In a fluid pressure brake, the combination with a brake pipe, a brake cylinder, and an emergency valve device comprising valve means having an emergency position for supplying fluid under pressure to said brake cylinder and another position for venting fluid under pressure from said brake cylinder, a movable abutment subject to the opposing pressures of the brake pipe and a chamber and operative according to the differential of pressures established between said brake pipe and chamber for positioning said valve means, the differential of pressures to move said valve means to the first mentioned position being provided by effecting an emergency reduction in brake pipe pressure, said emergency valve device being operative upon an increase in brake pipe pressure to ensure the building up of a differential of pressures sufficient to move said emergency valve device to the brake cylinder venting position.

17. In a fluid pressure brake, the combination with a brake pipe and an emergency valve device having a normal position, an application position and a releasing position, said emergency valve device comprising a piston subject to the opposing pressures of the brake pipe and a valve chamber communicating through a passageway with another chamber, and valve means movable by said piston, said valve means in the normal position establishing another communication between said chambers and in the application position closing the last mentioned communication and opening a vent from said other chamber, a valve device interposed in said passage and operative when the pressure in the valve chamber is reduced to a predetermined degree to close communication through said passage, and yielding means operative in the normal position to oppose movement of said piston and thereby said valve means to the releasing position.

18. In a fluid pressure brake, the combination with a brake pipe and an emergency valve device having a normal position, an application position and a releasing position, said emergency valve device comprising a piston subject to the opposing pressures of the brake pipe and a valve chamber communicating through a passageway with another chamber, and valve means movable by said piston, said valve means in the normal position closing a vent from said other chamber and in the application position opening said vent, valve means controlling communication through said passage and operative to close communication through said passage when the pressure in said valve chamber is reduced to a predetermined degree and operative when the pressure in said valve chamber is increased to a degree exceeding said predetermined degree to suddenly open communication through said passage, and yielding means operative in the normal position to oppose movement of said piston and valve means to the releasing position.

19. In a fluid pressure brake, the combination with a brake pipe, a brake cylinder and a quick action chamber divided into two connected portions, of emergency valve means controlled by the opposing pressures of the brake pipe and quick action chamber and movable upon an emergency reduction in brake pipe pressure to an emergency position for supplying fluid under pressure to said brake cylinder and for venting fluid under pressure from one portion and thereby from the other connected portion of said quick action chamber and movable upon an increase in brake pipe pressure to another position for venting fluid under pressure from said brake cylinder, and a piston subject at all times to the opposing pressures of the brake pipe and one portion of said quick action chamber and operative according to variations in said opposing pressures to effect the movement of said valve means, and means in the communication between said portions of the quick action chamber operative when the pressure, in that portion open to one side of said piston, is reduced to a predetermined degree, to close said communication, said valve means being operative upon movement from emergency position towards the other position to establish a communication through which fluid under pressure is vented from the portion of the quick action chamber which is open to one side of said piston.

20. In a fluid pressure brake, the combination with a brake pipe, a brake cylinder and a quick action chamber divided into two connected portions, of emergency valve means controlled by the opposing pressures of the brake pipe and quick action chamber and movable upon an emergency reduction in brake pipe pressure to an emergency position for supplying fluid under pressure to said brake cylinder and for venting fluid under pressure from one portion and thereby from the other connected portion of said quick action chamber and movable upon an increase in brake pipe pressure to another position for venting fluid under pressure from said brake cylinder, and a piston subject at all times to the opposing pressures of the brake pipe and one portion of said quick action chamber and operative according to variations in said opposing pressures to effect the movement of said valve means, and means in the communication between said portions of the quick action chamber operative when the pressure, in that portion open to one side of said piston, is reduced to a predetermined degree, to close said communication, said valve means being operative upon movement from emergency position toward the other position to establish another communication between the two portions of the quick action chamber.

21. In a fluid pressure brake, the combination with a brake pipe, a brake cylinder and a quick action chamber divided into two connected portions, of emergency valve means controlled by the opposing pressures of the brake pipe and quick action chamber and movable upon an emergency reduction in brake pipe pressure to an emergency position for supplying fluid under pressure to said brake cylinder and for venting fluid under pressure from one portion and thereby from the other connected portion of said quick action chamber and movable upon an increase in brake pipe pressure to another position for venting fluid under pressure from said brake cylinder, and a piston subject at all times to the opposing pressures of the brake pipe and one portion of said quick action chamber and operative according to variations in said opposing pressures to effect the movement of said valve means, and means in the communication between said portions of the quick action chamber operative when the pressure, in that portion open to one side of said piston, is reduced to a predetermined degree, to close said communication, and operative when the pressure in the last mentioned portion is increased to a predetermined degree to suddenly reduce said pressure to below said predetermined degree.

GLENN T. McCLURE.
DONALD L. McNEAL.